(12) United States Patent
Swaminathan et al.

(10) Patent No.: US 9,391,958 B2
(45) Date of Patent: *Jul. 12, 2016

(54) HARDWARE IMPLEMENTATION OF COMPLEX FIREWALLS USING CHAINING TECHNIQUE

(71) Applicant: JUNIPER NETWORKS, INC., Sunnyvale, CA (US)

(72) Inventors: Venkatasubramanian Swaminathan, San Jose, CA (US); Deepak Goel, Sunnyvale, CA (US); Jianhui Huang, Fremont, CA (US); John Keen, Mountain View, CA (US); Jean-Marc Frailong, Los Altos Hills, CA (US); Srinivasan Jagannadhan, Sunnyvale, CA (US); Srilakshmi Adusumalli, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,830

(22) Filed: Jun. 30, 2014

(65) Prior Publication Data

US 2014/0325635 A1    Oct. 30, 2014

Related U.S. Application Data

(63) Continuation of application No. 13/172,621, filed on Jun. 29, 2011, now Pat. No. 8,800,021.

(51) Int. Cl.
*H04L 29/06* (2006.01)
(52) U.S. Cl.
CPC ............ *H04L 63/0263* (2013.01); *H04L 63/02* (2013.01); *H04L 63/0209* (2013.01)

(58) Field of Classification Search
CPC .. H04L 63/02; H04L 63/0209; H04L 63/0263
See application file for complete search history.

(56) References Cited

U.S. PATENT DOCUMENTS 5,867,651 A    2/1999   Dan et al.
7,055,173 B1   5/2006   Chaganty et al.
(Continued)

OTHER PUBLICATIONS

Co-pending U.S. Appl. No. 13/172,621, filed Jun. 29, 2001, titled "Hardware Implementation of Complex Firewalls Using Chaining Technique," Venkatasubramanian Swaminathan et al., 45 pages.

*Primary Examiner* — Joseph P Hirl
*Assistant Examiner* — Thomas Gyorfi
(74) *Attorney, Agent, or Firm* — Harrity & Harrity, LLP

(57) ABSTRACT

A firewall device may include a forwarding component that includes a filter block. The filter block may obtain a first hardware-implemented filter, where a hardware implementation limits the first hardware-implemented filter to a maximum quantity of rules; determine whether a last rule associated with the accessed hardware-implemented filter includes a split-filter action, where the split-filter action identifies a second hardware-implemented filter; and link the second hardware-implemented filter to the first hardware-implemented filter to make the second hardware-implemented filter a logical continuation of the first hardware-implemented filter, in response to determining that the last rule includes the split-filter action. The filter block may further determine whether a particular rule of the first hardware-implemented filter includes a next-filter action, where the next filter action identifies a third hardware-implemented filter; and process the third hardware-implemented filter independently of the sequence of hardware attachment points.

20 Claims, 8 Drawing Sheets

(56) References Cited

U.S. PATENT DOCUMENTS

| | | |
|---|---|---|
| 7,120,931 B1 | 10/2006 | Cheriton |
| 8,024,787 B2 | 9/2011 | Oz et al. |
| 8,065,721 B1 * | 11/2011 | Shah ............................ 726/13 |
| 8,358,583 B2 * | 1/2013 | Williams ..................... 370/235 |
| 2002/0023089 A1 | 2/2002 | Woo |
| 2006/0195896 A1 | 8/2006 | Fulp et al. |
| 2006/0230442 A1 * | 10/2006 | Yang .............................. 726/11 |
| 2007/0271605 A1 | 11/2007 | Le Pennec et al. |
| 2008/0244726 A1 | 10/2008 | Le Pennec et al. |
| 2009/0144819 A1 | 6/2009 | Babbar |
| 2011/0030049 A1 | 2/2011 | Adams et al. |

* cited by examiner

433 →

| FILTER #1 | FILTER #2 | ... | FILTER #P |
|---|---|---|---|
| ATTACHMENT POINT 501-A | ATTACHMENT POINT 501-B | ... | ATTACHMENT POINT 501-P |
| FILTER ID 502-A | FILTER ID 502-B | ... | FILTER ID 502-P |

HARDWARE IMPLEMENTATION OF COMPLEX FIREWALLS USING CHAINING TECHNIQUE

RELATED APPLICATION

This application is a continuation of U.S. patent application Ser. No. 13/172,621 filed Jun. 29, 2011, which is incorporated herein by reference.

BACKGROUND

Communication networks typically include network elements, which transfer or switch data from one or more sources to one or more destinations. For example, the network element may receive a data unit from a source device (or another network element), may determine a destination for the data unit, and may send an original or a modified data unit to a destination device (or another network element). A network element may function as a firewall that may filter packets based on one or more filters. For example, a firewall may forward a first packet and drop a second packet based on running a filter on the first and second packets. While a firewall may be implemented via software installed on the network element, such an implementation may be too slow. Thus, a firewall may be implemented within the hardware of the network element. However, a hardware implementation of a firewall may impose limits on the complexity of the filters.

SUMMARY OF THE INVENTION

According to one aspect, a method performed by a firewall device, may include accessing a first hardware-implemented filter, where the hardware implementation limits the first hardware-implemented filter to a maximum quantity of rules; determining whether a last rule, associated with the accessed hardware-implemented filter, includes a split-filter action, where the split-filter action identifies a second hardware-implemented filter; and linking the second hardware-implemented filter to the first hardware-implemented filter to make the second hardware-implemented filter a logical continuation of the first hardware-implemented filter, in response to determining that the last rule includes the split-filter action.

According to another aspect, a method performed by a firewall device, may include obtaining, by the firewall device, filter specifications for a first hardware-implemented filter; determining, by the firewall device, whether the filter specifications include a quantity of filter rules that exceeds a maximum quantity of filter rules based on a hardware implementation; inserting, by the firewall device, a split-filter action into the last rule of the first hardware-implemented filter, where the split-filter action identifies a second hardware-implemented filter as a logical continuation of the first hardware-implemented filter, when the quantity of filter rules exceeds the maximum quantity of filter rules; and inserting, by the firewall device, at least one filter rule, associated with the filter specifications, into the second hardware-implemented filter, when the quantity of filter rules exceeds the maximum quantity of filter rules According to yet another aspect, a firewall device may include a forwarding component that includes a filter block. The filter block may access a first hardware-implemented filter, where the hardware implementation limits the first hardware-implemented filter to a maximum quantity of rules; determine whether a last rule associated with the accessed hardware-implemented filter includes a split-filter action, where the split-filter action identifies a second hardware-implemented filter; and link the second hardware-implemented filter to the first hardware-implemented filter to make the second hardware-implemented filter a logical continuation of the first hardware-implemented filter, in response to determining that the last rule includes the split-filter action According to yet another aspect, a non-transitory computer-readable medium, storing instructions executable by one or more processors, may include one or more instructions to receive a packet; one or more instructions to access a first hardware-implemented filter, where the hardware implementation limits the first hardware-implemented filter to a maximum quantity of rules; one or more instructions to obtain a key based on the received packet; one or more instructions to compare the key to a match condition associated with a particular rule of the first hardware-implemented filter; one or more instructions to execute one or more actions associated with the particular rule when the key matches the match condition associated with the particular rule; one or more instructions to determine whether the particular rule includes a next-filter action, where the next-filter action identifies a second hardware-implemented filter; one or more instructions to process the second hardware-implemented filter as a filter different from the first hardware-implemented filter; one or more instructions to determine whether a last rule associated with the accessed hardware-implemented filter includes a split-filter action, where the split-filter action identifies a third hardware-implemented filter; and one or more instructions to link the third hardware-implemented filter to the first hardware-implemented filter to make the third hardware-implemented filter a logical continuation of the first hardware-implemented filter, in response to determining that the last rule includes the split-filter action.

BRIEF DESCRIPTION OF THE DRAWINGS

The accompanying drawings, which are incorporated in and constitute a part of this specification, illustrate the implementations described herein and, together with the description, explain these implementations. In the drawings.

DETAILED DESCRIPTION

Figure 1:
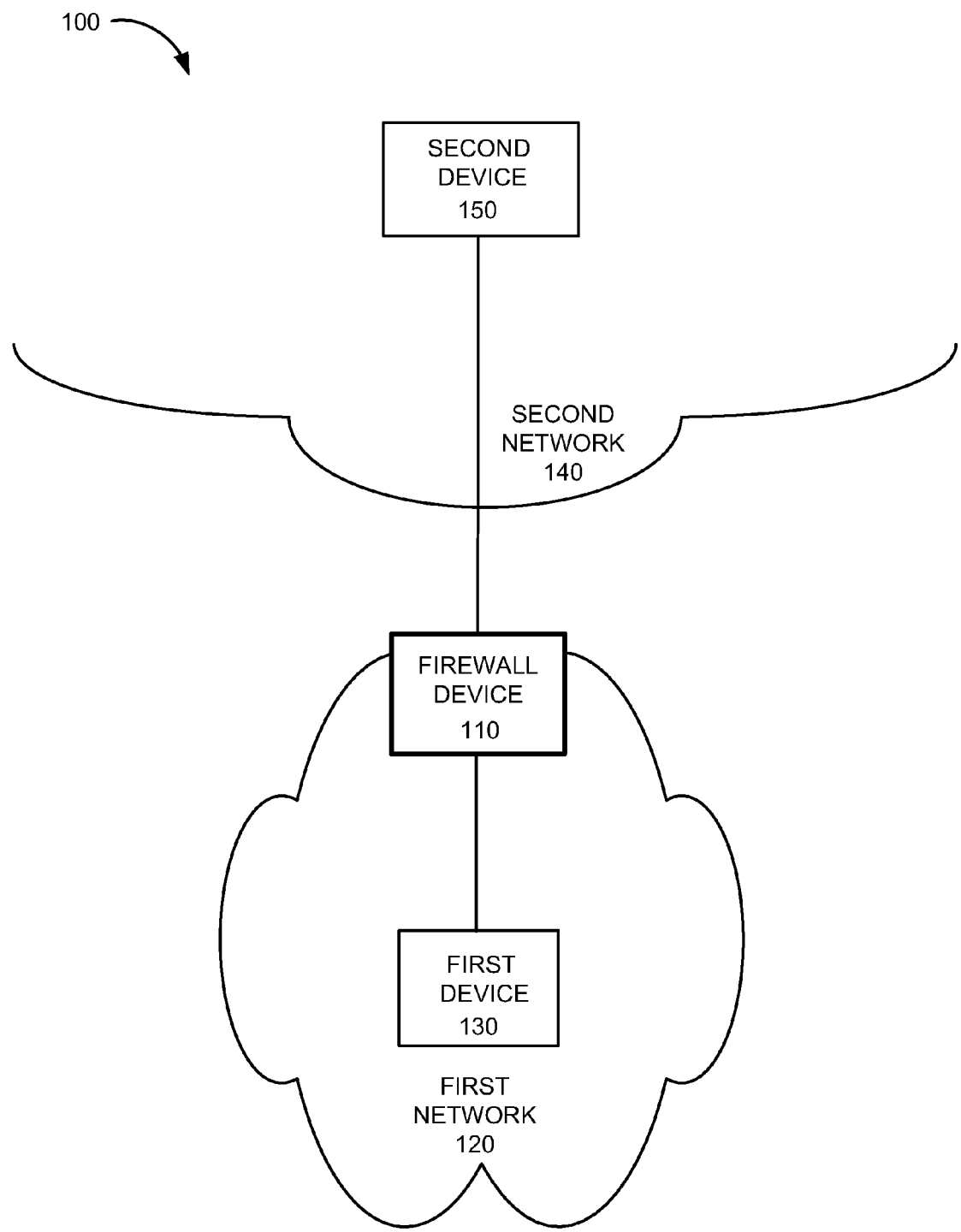
FIG. 1 is a diagram illustrating an example system according to an implementation described herein.

The following detailed description refers to the accompanying drawings. The same reference numbers may be used in different drawings to identify the same or similar elements.

An implementation described herein may relate to a hardware implementation of complex firewalls using a chaining technique. A firewall, as the term is used herein, may refer to any device, or group of devices, that processes packets based on one or more filters. A filter may include one or more rules, with a particular rule being associated with one or more actions. If a packet matches the particular rule, the firewall may perform the one or more actions. For example, a filter may include a rule that a packet, with a particular destination address and received at a particular port, should be dropped. A "packet" may refer to a packet, a datagram, or a cell; a fragment of a packet, a fragment of a datagram, or a fragment of a cell; or another type, arrangement, or packaging of data.

A software implementation of a firewall filter may not be limited to a particular number of rules. Thus, the filter may have an arbitrary number of rules. However, firewall devices may require that packets be processed at a high speed with minimum latency. Therefore, a firewall device may include a hardware implementation of a firewall. For example, functionality of a firewall may be implemented in an application specific integrated circuit (ASIC) chip. In a hardware implementation of the firewall, a filter may be bound by a maximum number of rules (e.g., 1,024 rules per filter, 2048 rules per filter, etc.). However, complex firewalls may require filters with a number of rules that exceeds such capacity. For example, the hardware implementation may limit a filter to a maximum of 1,024 rules, and a particular filter may require that a packet be checked for 2,000 different destination addresses.

One possible solution may be to increase the maximum number of rules. However, increasing the maximum number of rules may result in increased hardware complexity, an increase in chip area, and an increase in the load of software maintaining tables associated with the filters of the firewall. Furthermore, increasing the maximum number of rules may not be a scaleable approach, as this may simply result in a new maximum number of rules, which may not be sufficient in the future.

An implementation described herein may relate to changing an internal execution sequence of a filter in hardware by chaining multiple filters using special action types. A first special action type may include a split-filter action. A split-filter action may be used to logically connect two different physical filters and may indicate, to firewall filter hardware, to treat the filter identified in the split-filter action as a continuation of the filter currently being executed. For example, a last rule of a filter may include a split-filter action that identifies another filter that includes additional rules to be processed, and the additional rules may be treated by the firewall filter hardware as a continuation of the current filter. Thus, a split-filter action may used to overcome a hardware limitation on a number of rules per filter.

A second special action type may include a next-filter action. A next-filter action may determine a next-filter to be executed for the packet independent of a hardware-implemented filter sequence. For example, a particular rule of a filter may include a match condition and a next-filter action that identifies a particular filter. If the match condition is satisfied for a packet, the particular filter may next be executed. For example, a rule of a filter may include a match condition to determine whether a packet is associated with a particular Virtual Private Network (VPN), and an associated next-filter action. If the match condition is satisfied, a filter only relevant to packets associated with the VPN network may be executed. Thus, a next-filter action type may provide a finer control of a sequence of execution of filters.

Furthermore, an implementation described herein may relate to programming a hardware-implemented filter based on a set of filter specifications. For example, if there are one or more preconditions for running the filter, a next filter action may be generated in another filter that checks for the one or more preconditions. As another example, if the number of rules exceeds a maximum, a split-filter action may be generated for a last rule in the filter and additional rules for the filter may be designated to be included in a filter identified by the split-filter action.

FIG. 1 is a diagram illustrating an example system 100 according to an implementation described herein. As shown in FIG. 1, system 100 may include a firewall device 110, a first network 120, a first device 130, a second network 140, and a second device 150.

Firewall device 110 may function as a firewall for first network 120. If first device 130, which may be part of first network 120, attempts to communicate with second device 150, which may be part of second network 140, packets sent by first device 130 and/or packets destined for first device 130 may be filtered by firewall device 110 based on one or more filters. For example, firewall device 110 may determine whether to drop or forward a packet sent by or destined for first device 130.

Firewall device 110 may include any device that receives and transmits packets within a network or between networks and that includes a firewall function. Firewall device 110 may include, for example, a gateway, a router, a switch, a firewall, a network interface card (NIC), a hub, a bridge, a proxy server, an optical add-drop multiplexer (OADM), or some other type of device (e.g., a layer 2 and/or layer 3 device) that processes and/or transfers traffic. Firewall device 110 may include one or more ingress interfaces and one or more egress interfaces. Firewall device 110 may receive a packet at one of the ingress interfaces, determine a destination of the received packet, filter the packet based on one or more filters, determine an egress interface based on the determined destination, and, if the processing based on the one or more filters results in a permission to forward the packet, may forward the packet via the determined egress interface.

First network 120 and second network 140 may each include one or more of: a packet-switched network, a circuit-switched network, or one or more packet-switched networks and/or circuit-switched networks of different types. For example, first network 120 and second network 140 may include one or more of: a local area network (LAN), a wide area network (WAN), a metropolitan area network (MAN), an optical network, a cable television network, a satellite television network, a wireless access network (e.g., a Code Division Multiple Access (CDMA) network, a general packet radio service (GPRS) network, a Long Term Evolution (LTE) network, and/or another type of access network), an ad hoc network, a telephone network (e.g., the Public Switched Telephone Network (PSTN) or a cellular network), an intranet, the Internet, or a combination of these networks or other types of networks.

First device 130 and second device 150 may each include any device with a communication function, such as, for example, a personal computer or workstation; a server device; a portable computer; a printer, fax machine, or another type of physical medium output device; a television, a projector, a speaker, or another type of a display or audio output device; a set-top box; a gaming system; a camera, a video camera, a microphone, a sensor, or another type of input or content recording device; a portable communication device (e.g. a mobile phone, a smart phone, a tablet computer, a global positioning system (GPS) device, and/or another type of wireless device); a voice over Internet Protocol (VoIP) telephone device; a radiotelephone; a gateway, a router, a switch, a firewall, a NIC, a hub, a bridge, a proxy server, an OADM, or another type of firewall device; and/or any type of device with communication capability.

Although FIG. 1 shows example components of system 100, in other implementations, system 100 may include fewer components, different components, differently arranged components, and/or additional components than depicted in FIG. 1. Additionally or alternatively, one or more components of system 100 may perform one or more tasks described as being performed by one or more other components of system 100. For example, first network 120 and second network 140 may correspond to the same network.

Figure 2:
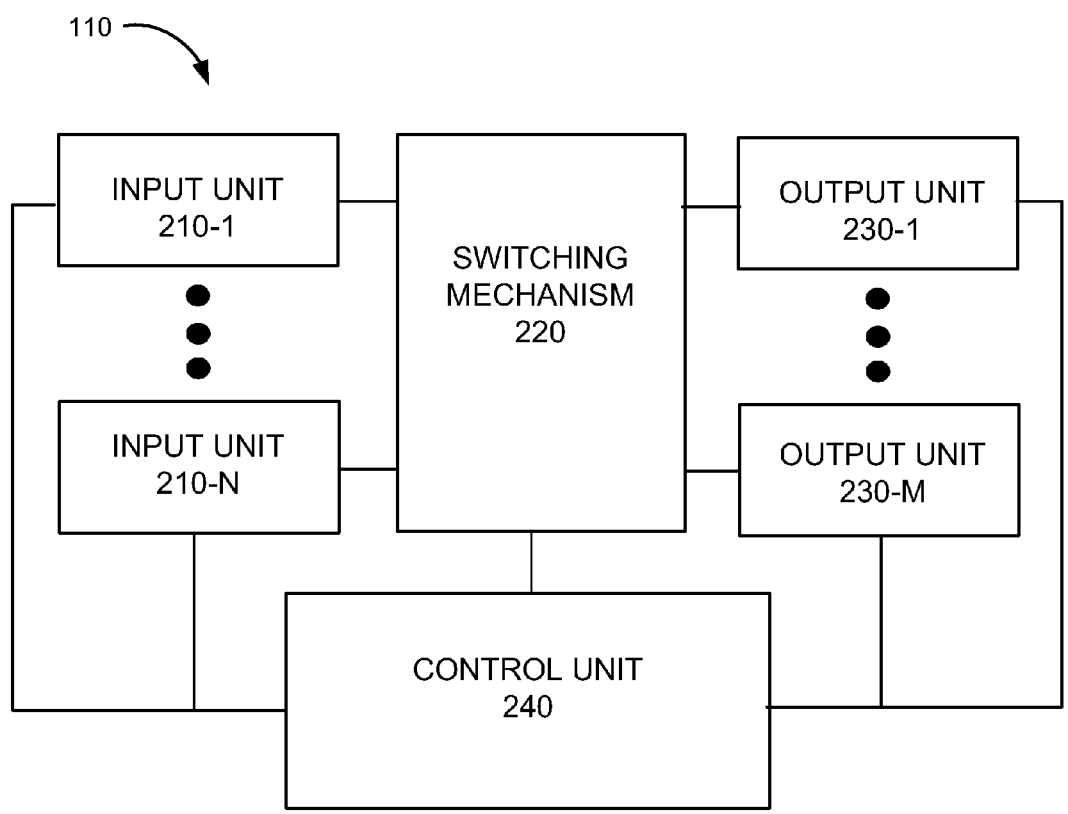
FIG. 2 is a diagram illustrating example components of a firewall device of the system of FIG. 1.

FIG. 2 is a diagram illustrating example components of firewall device 110 of the system of FIG. 1. As shown in FIG. 2, firewall device 110 may include one or more input units 210-1 to 210-N (referred to herein individually as "input unit 210" and collectively as "input units 210"), a switching mechanism 220, one or more output units 230-1 to 230-N (referred to herein individually as "output unit 230" and collectively as "output units 230"), and/or a control unit 240.

Input units 210 may be the points of attachments for physical links and may be the points of entry for incoming traffic. An input unit 210 may be associated with an interface card (not shown in FIG. 2). Input unit 210 may perform some or all of data plane processing associated with an incoming packet. Data plane processing may encompass looking up a destination address for an incoming packet, removing or changing a label associated with the packet, determining a path through switching mechanism 220, and/or filter the packet based on one or more firewall filters.

Switching mechanism 220 may include one or more switching planes and/or fabric cards to facilitate communication between input units 210 and output units 230. In one implementation, each of the switching planes and/or fabric cards may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input units 210 and output units 230.

Output units 230 may store traffic received from input units 210 and may schedule the traffic on one or more output physical links. An output unit 230 may be associated with an interface card (not shown in FIG. 2). Output unit 230 may perform some or all of data plane processing associated with an outgoing packet. For example, output unit 230 may classify the packet based on a quality of service class, schedule the packet in a particular queue, add or change a label associated with the packet, and/or filter the packet based on one or more firewall filters.

Control unit 240 may interconnect with input units 210, switching mechanism 220, and/or output units 230 and may control operation of firewall device 110. For example, control unit 240 may perform control plane operations associated with firewall device 110 (e.g., control unit 240 may use routing protocols and may create a forwarding table that is used in traffic forwarding). Control unit 240 may program one or more filters used by input unit 210.

Although FIG. 2 shows example components of firewall device 110, in other implementations, firewall device 110 may include fewer components, different components, differently arranged components, and/or additional components than depicted in FIG. 2. Additionally or alternatively, one or more components of firewall device 110 may perform one or more tasks described as being performed by one or more other components of firewall device 110.

Figure 3:
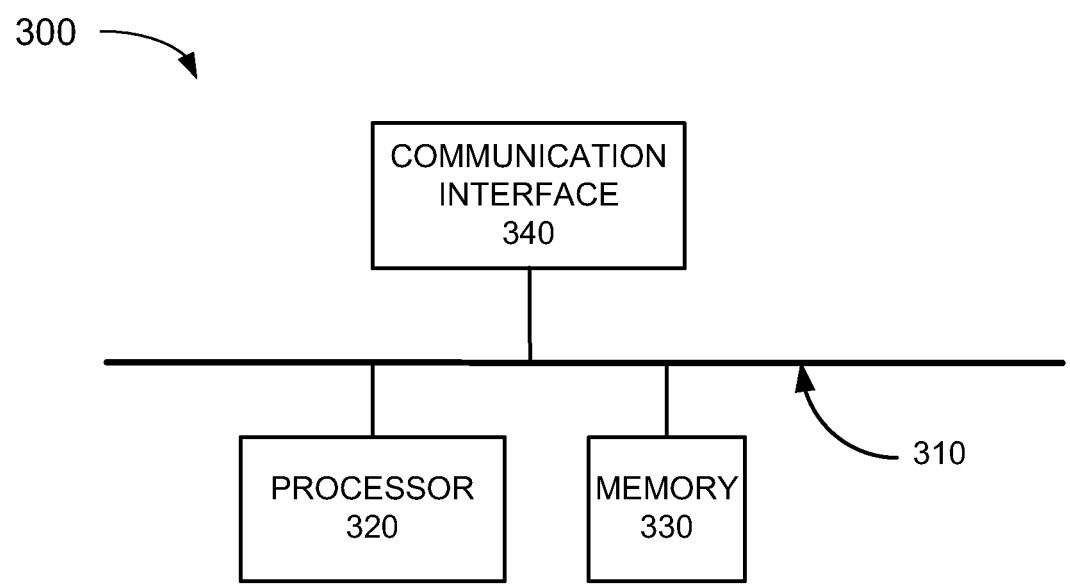
FIG. 3 is a diagram illustrating example components of a device that corresponds to one of the components of FIG. 2.

FIG. 3 is a diagram illustrating example components of a device 300 according to an implementation described herein. In one implementation, device 300 may correspond to one or more of the components of firewall device 110, such as input unit 210, switching mechanism 220, output unit 230, and/or control unit 240. For example, each of input unit 210, switching mechanism 220, output unit 230, and/or control unit 240 may include one or more devices 300. In another implementation, device 300 may correspond only to control unit 240. As shown in FIG. 3, device 300 may include a bus 310, a processor 320, a memory 330, and a communication interface 340.

Bus 310 may include a path, or a set of paths, that permits communication among the components of device 300. Processor 320 may include one or more processors, microprocessors, or processing logic (e.g., application specific integrated circuits (ASICs), field programmable gate arrays (FPGAs), etc.) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Communication interface 340 may include any transceiver-like mechanism that enables device 300 to communicate with other devices and/or systems. For example, communication interface 340 may include a modem, a network interface component, and/or a wireless interface component.

As will be described in detail below, device 300 may perform certain operations. Device 300 may perform these operations in response to processor 320 executing software instructions contained in a computer-readable medium, such as memory 330. A computer-readable medium may be defined as a non-transitory memory device. A memory device may include memory space within a single physical memory device or spread across multiple physical memory devices.

The software instructions may be read into memory 330 from another computer-readable medium, or from another device via communication interface 340. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, additional components, or differently arranged components than depicted in FIG. 3. Additionally or alternatively, one or more components of device 300 may perform one or more tasks described as being performed by one or more other components of device 300.

Figure 4:
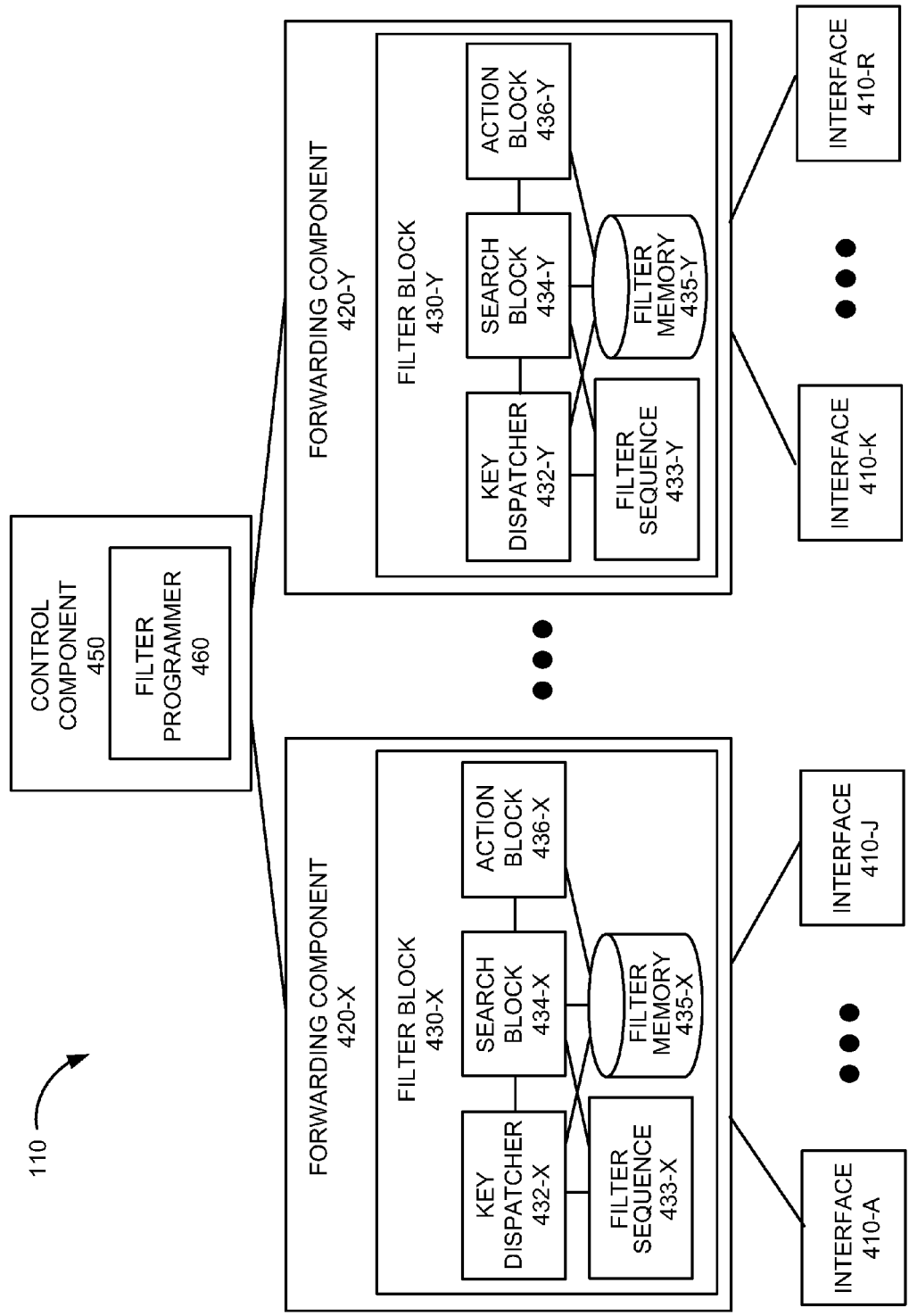
FIG. 4 is a diagram illustrating example functional components of a firewall device of the system of FIG. 1.

FIG. 4 is a diagram illustrating example functional components of firewall device 110. As shown in FIG. 4, firewall device 110 may include one or more interfaces 410-A to 410-N (referred to herein collectively as "interfaces 410" and individually as "interface 410"), one or more forwarding components 420-X to 420-Y (referred to herein collectively as "forwarding components 420" and individually as "forwarding component 420"), and a control component 450.

Interface 410 may be associated with one or more physical ports and/or one or more logical ports. Interface 410 may receive packets from another interface 410 or from a remote interface and/or may send packets to another interface 410 or to a remote interface.

Forwarding component 420 may perform data plane processing for a set of interfaces. For example, forwarding component 420-X may perform data plane processing for interfaces 410-A through 410-J. Forwarding component 420 may receive a packet from a particular interface 410 and may look up a destination interface 410 for the packet in a forwarding table.

Forwarding component 420 may include a filter block 430. Filter block 430 may function as a firewall that filters packets based on one or more filters. Filter block 430 may include a key dispatcher 432, a filter sequence 433, a search block 434, a filter memory 435, and an action block 436.

Filter block 430 may process a packet according to one or more filters based on an order specified in filter sequence 433. Key dispatcher 432 may determine a next filter to use from filter sequence 433 and may generate a set of keys based on data included in the packet and based on a filter type associated with the determined filter. Filter sequence 433 may include a sequence of hardware attachment points, with each hardware attachment point being associated with a particular filter. Filter sequence 433 is described below in more detail with reference to FIG. 5A.

Key dispatcher 432 may forward the set of keys to search block 434. Search block 434 may search the generated keys with respect to the determined filter by comparing the generated keys with match conditions of rules associated with the filter. Search block 434 may access filter memory 435 during the search. Filter memory 435 may store one or more filters. Example information that may be stored in filter memory 435 is described below with reference to FIGS. 5B and 5C.

Action block 436 may perform one or more actions specified by a rule, if a match condition associated with the rule matches one of the generated keys. For example, action block 436 may accept a packet; reject a packet; copy a packet; modify a traffic class associated with the packet; add, remove, or change a label associated with the packet; change a domain associated with the packet; increment a particular counter; execute a split-filter action; and/or execute a next-filter action. A split filter action may be included in a last rule of a filter and may indicate that additional rules are to be executed for the filter. The additional rules may be stored in another physical filter logically linked to the filter currently being executed. A next-filter action may be included in any rule of the filter and may indicate a next filter that is to be executed for the packet. The next filter may be executed independent of an order of attachment of filters in the hardware.

Control component 450 may program forwarding component 420. For example, control component 450 may perform control plane processing for forwarding components 420. In one example, if forwarding component 420 includes a forwarding table, control component 450 may include a routing table and may use the routing table to generate and/or update the forwarding table.

Control component 450 may include filter programmer 460. Filter programmer 460 may program filters stored in filter memory 435. For example, filter programmer 460 may receive filter specifications associated with a filter, may generate rules for the filter, and may store the generated rules in filter memory 435. In one example, filter programmer 460 may receive the filter specifications from an operator that is programming or updating firewall device 110 via communication interface 340 associated with control unit 240.

Filter programmer 460 may determine whether the filter specifications for a particular filter require a number of rules that exceeds a maximum number of rules per physical filter and may, in response, insert a split-filter action into a last rule of the particular filter. The split-filter action may identify another physical filter, may logically link the other physical filter to the particular filter, and may insert additional rules, associated with the particular filter, into the other physical filter.

Filter programmer 460 may determine whether one of the rules, for the particular filter, requires an additional filter to be executed in connection with the particular filter, outside of the filter order specified in filter sequence 433, and may insert a next-filter action into the rule that requires the additional filter. The next-filter action may specify another filter that is to be executed after the current filter is finished.

Although FIG. 4 shows example functional components of firewall device 110, in other implementations, firewall device 110 may include fewer functional components, different functional components, differently arranged functional components, and/or additional functional components than depicted in FIG. 4. Additionally or alternatively, one or more functional components of firewall device 110 may perform one or more tasks described as being performed by one or more other functional components of firewall device 110.

Figures 5A, 5B:
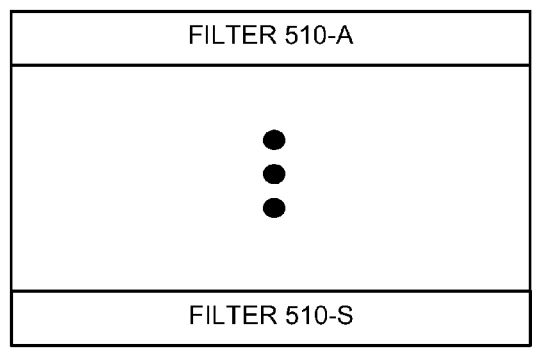
FIG. 5A is a diagram of example fields of the filter sequence of FIG. 4.
FIGS. 5B and 5C are diagrams illustrating example fields of the filter memory of FIG. 4.

FIG. 5A is a diagram of example fields of filter sequence 433. Filter sequence 433 may specify a sequence of filters from filter #1 to filter #P that is to be processed with respect to a packet and with respect to a particular packet direction. For example, a first filter sequence may be associated with packets in an ingress direction (e.g., incoming packets) and a second filter sequence may be associated with packets in an egress direction (e.g., outgoing packets).

As shown in FIG. 5A, filter sequence 433 may include attachment points 501-A to 501-P (referred to herein collectively as "attachment points 501" and individually as "attachment point 501") and corresponding filter identifiers (IDs) 502-A to 502-P (referred to herein collectively as "filter IDs 502" and individually as "filter ID 502").

Attachment points 501 may specify hardware attachment points associated with each filter. For example, if forwarding component 420 is implemented in input unit 210, attachment points 501 may be associated with an ingress port. For example, attachment point 501-A may be associated with a logical port, attachment point 501-B may be associated with a first level 2 (L2) domain filter, attachment point 501-C may be associated with a second L2 domain filter, attachment point 501-D may be associated with a third L2 domain filter, attachment point 501-E may be associated with a first level 3 (L3) Virtual Private Network (VPN), etc. As another example, if forwarding component 420 is implemented in output unit 230, attachment points 501 may be associated with an egress port. For example, attachment point 501-A may be associated with an L3 VPN, attachment point 501-B may be associated with a first L2 domain filter, attachment point 501-C may be associated with a second L2 domain filter, attachment point 501-D may be associated with a third L2 domain filter, attachment point 501-E may be associated with a logical port, etc.

Filter ID 502 may specify a particular filter from filter memory 435 that is to be executed at a particular attachment point 501.

Although FIG. 5A shows example fields of filter sequence 433, in other implementations, filter sequence 433 may contain fewer fields, different fields, additional fields, or differently arranged fields than depicted in FIG. 5A.

Figure 5C:
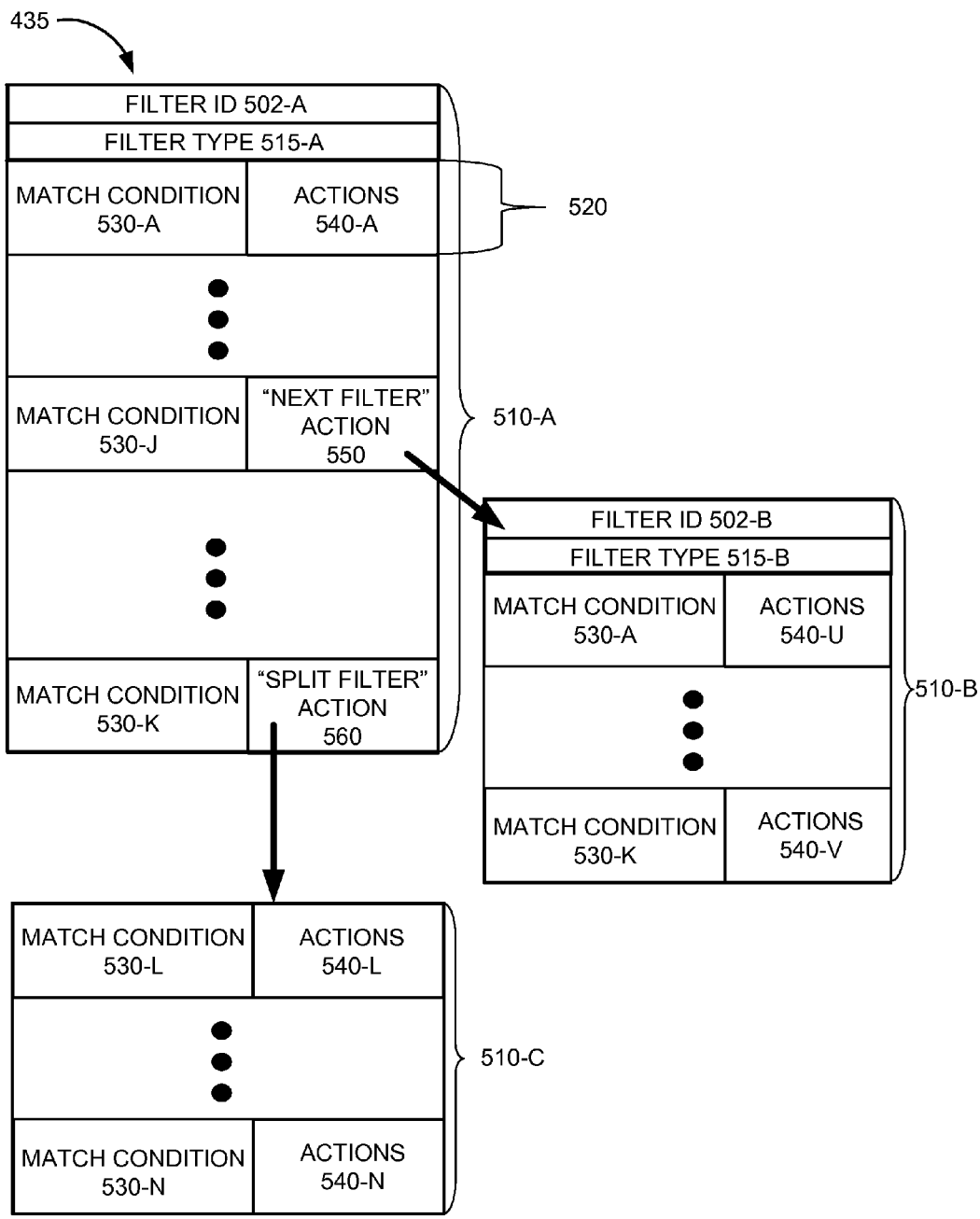

FIGS. 5B and 5C are diagrams illustrating example fields of the filter memory 435. FIG. 5B illustrates that filter memory 435 may store filters 510-A to 510-Z (referred to herein collectively as "filters 510" and individually as "filter 510"). FIG. 5C illustrates example fields of filters 510. As shown in FIG. 5C, filter 510 may include a filter ID field 502, a filter type field 515, and a set of rules 520.

Filter ID field 502 may include a set of bits that uniquely identifies filter 510. Filter type 515 may store information identifying a filter type associated with filter 510. For example, the filter type may identify the filter as an L2 filter, an L3 filter, a filter associated with a particular protocol, etc. The filter type may be used by key dispatcher 432 to obtain a set of keys from a packet.

Each filter 510 may be limited to a maximum number of rules based on a particular hardware limitation. In one example, each filter 510 may include a maximum of 1,024 rules. In another example, each filter 510 may include a maximum of 2,048 rules. In yet another example, each filter 510 may include a different limitation on the maximum number of rules.

Each rule 520 may include a match condition field 530 and an associated actions field 540. Match condition field 530 may store a match condition for rule 520 and actions field 540 may store one or more actions associated with rule 520. If keys, obtained from a packet, match the match condition, the set of actions may be executed by action block 436. Example actions may include to drop the packet; reject the packet; copy the packet; modify a traffic class associated with the packet; add, remove, or change a label associated with the packet; change a domain associated with the packet; increment a particular counter; and/or any other type of action that may be performed in association with the packet.

Two special actions may be included in filter 510. Rule 520 may store a next-filter action 550. Next-filter action 550 may point to another filter 510-B that is to be executed outside of the filter sequence specified in filter sequence 433. For example, match condition 530-J may check to see whether a packet is associated with a particular label that requires an additional filter. If the packet matches match condition 530-J, then next filter action 550 may cause filter 510-B to be executed after filter block 430 is finished with filter 510-A. This may prevent filter 510-B from being executed with respect to packets to which filter 510-B does not apply.

A last rule 520 of filter 510 may store a split-filter action 560. Match condition 530-K may be set to match any packet so that split-filter action 560 is always executed. Split-filter action 560 may direct filter block 430 to execute filter 510-C, which may be a separate physical filter with additional rules 530-L to 530-N, while being logically considered as part of filter 510-A. Thus, any actions associated with completion of execution of a filter, such as updating of packet labels based on filter actions, or the obtaining of packet keys for a next filter, may not be performed until the last rule is executed.

If the second physical filter 510-C is not sufficient to accommodate all of the rules of the filter, the last rule of second physical filter 510-C may again include a split-filter action 560 to link a third physical filter to the filter. This process may be continued until all of the rules, required for the filter, are stored. Furthermore, any of actions 540-L to 540-N of filter 510-C may include a next-filter action 550; any of actions 540-X to 540-Y of filter 510-B may include a next-filter action 550; and last rule of filter 510-B, which includes actions 540-Y, may include a split-filter action 560. Thus, using split-filter actions and next-filter actions, physical (i.e., hardware) filters 510 may be chained without limit, thereby overcoming limitations to a maximum number of rules in a single physical filter and overcoming limitations to a hardware attachment sequence of filters specified in filter sequence 433.

Although FIGS. 5B and 5C shows example fields of filter memory 435, in other implementations, filter memory 435 may contain fewer fields, different fields, additional fields, or differently arranged fields than depicted in FIGS. 5B and 5C.

Figure 6:
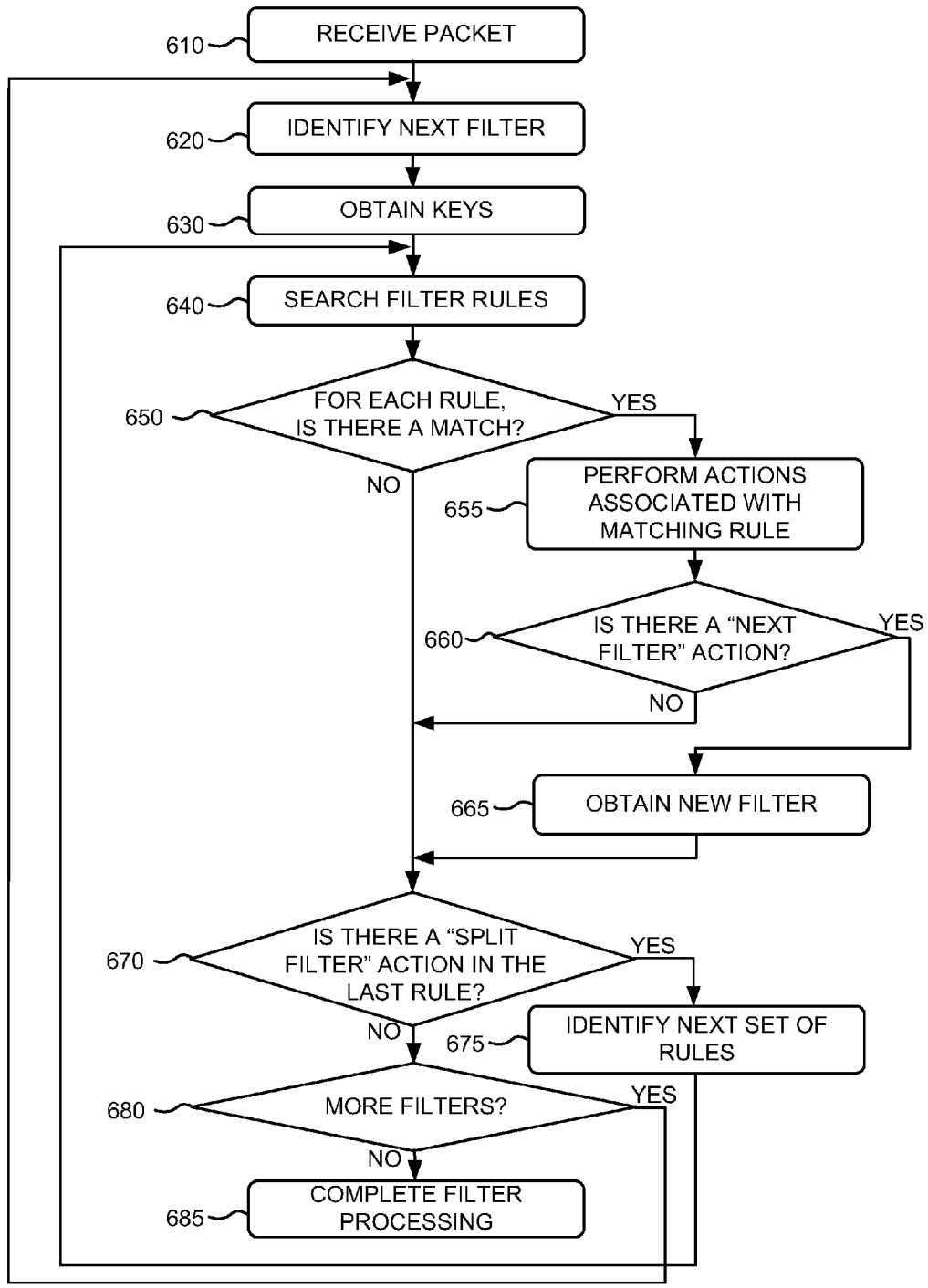
FIG. 6 is a diagram of a flow chart illustrating an example process for processing a packet with respect to a filter according to an implementation described herein.

FIG. 6 is a diagram of a flow chart illustrating an example process for processing a packet with respect to a filter according to an implementation described herein. In one implementation, the process of FIG. 6 may be performed by firewall device 110. In other implementations, some or all of the process of FIG. 6 may be performed by another device or a group of devices separate and/or possibly remote from or including firewall device 110.

The process of FIG. 6 may include receiving a packet (block 610). For example, filter block 430 may obtain a packet received at interface 410. A next filter may be identified (block 620). For example, filter block 430 may obtain a filter ID for a next filter to be executed according to filter sequence 433. Based on the filter ID, filter block 430 may identify a filter in filter memory 435 and may begin to process the packet using the identified filter.

Keys may be obtained (block 630). For example, key dispatcher 432 may identify a filter type based on filter type field 515 and may obtain keys from the received packet based on the filter type and based on labels associated with the packet, such as a destination address label, a source address label, a quality of service label, etc.

Filter rules may be searched (block 640) and a determination may be made for each rule as to whether there is a match (block 650). For example, search block 434 may compare the obtained keys to the match conditions of the filter rules of the identified filter. If it is determined that there is a match (block 650—YES), actions associated with the matching rule may be performed (block 655). For example, action block 436 may perform actions associated with the matching rule. Example actions, that may be performed, may include to drop the packet; reject the packet; copy the packet; modify a traffic class associated with the packet; add, remove, or change a label associated with the packet; change a domain associated with the packet; increment a particular counter; and/or any other type of action that may be performed in association with the packet.

A determination may be made as to whether there is a next-filter action in the matching rule (block 660) and if it is determined that there is a next-filter action (block 660—YES), a new filter may be obtained (block 665). For example, action block 436 may identify a next filter based on a filter ID specified by the next-filter action and may designate that the next filter is to be executed after the current filter has been finished. Processing may continue to block 670. If it is determined that there is no next-filter action (block 660—NO), processing may also continue to block 670.

A determination may be made as to whether there is a split-filter action in the last rule (block 670). For example, action block 436 may determine whether the last rule of the filter includes a split-filter action. If it is determined that there is a split-filter action in the last rule of the filter (block 670—YES), a next set of rules may be identified (block 675). For example, filter block 430 may identify a next physical filter in filter memory 435 that is a logical continuation of the current filter. Processing may return to block 640, to search the next set of identified filter rules.

If it is determined that there is no split-filter action in the last rule, a determination may be made as to whether there are more filters to be processed (block 680). For example, filter block 430 may determine whether there is a next filter to be processed by accessing filter sequence 433. If it is determined that there are more filters to be processed (block 680—YES), processing may return to block 620 to identify the next filter and to obtain the next set of keys for the filter.

If it is determined that there are no more filters to process (block 680—NO), filter processing may be completed (block 685). For example, filter block 430 may complete processing of the packet, may update the packet based on the actions performed while processing the filters and, if the packet was not dropped by filter block 430, forwarding component 420 may continue to process the packet, such as by forwarding the packet to an egress interface.

One difference between a split-filter action and a next-filter action should be noted. Since filter actions may have changed fields of the packet, keys computed by key dispatcher 432 for the next filter may result in different key values. Since a split-filter action identifies a continuation of the current filter, even though the split-filter action identifies a new hardware filter, no new keys are obtained and the new hardware filter is processed using the previously obtained keys. In contrast, a next-filter action identifies a new filter, for which new keys may be computed.

Figure 7:
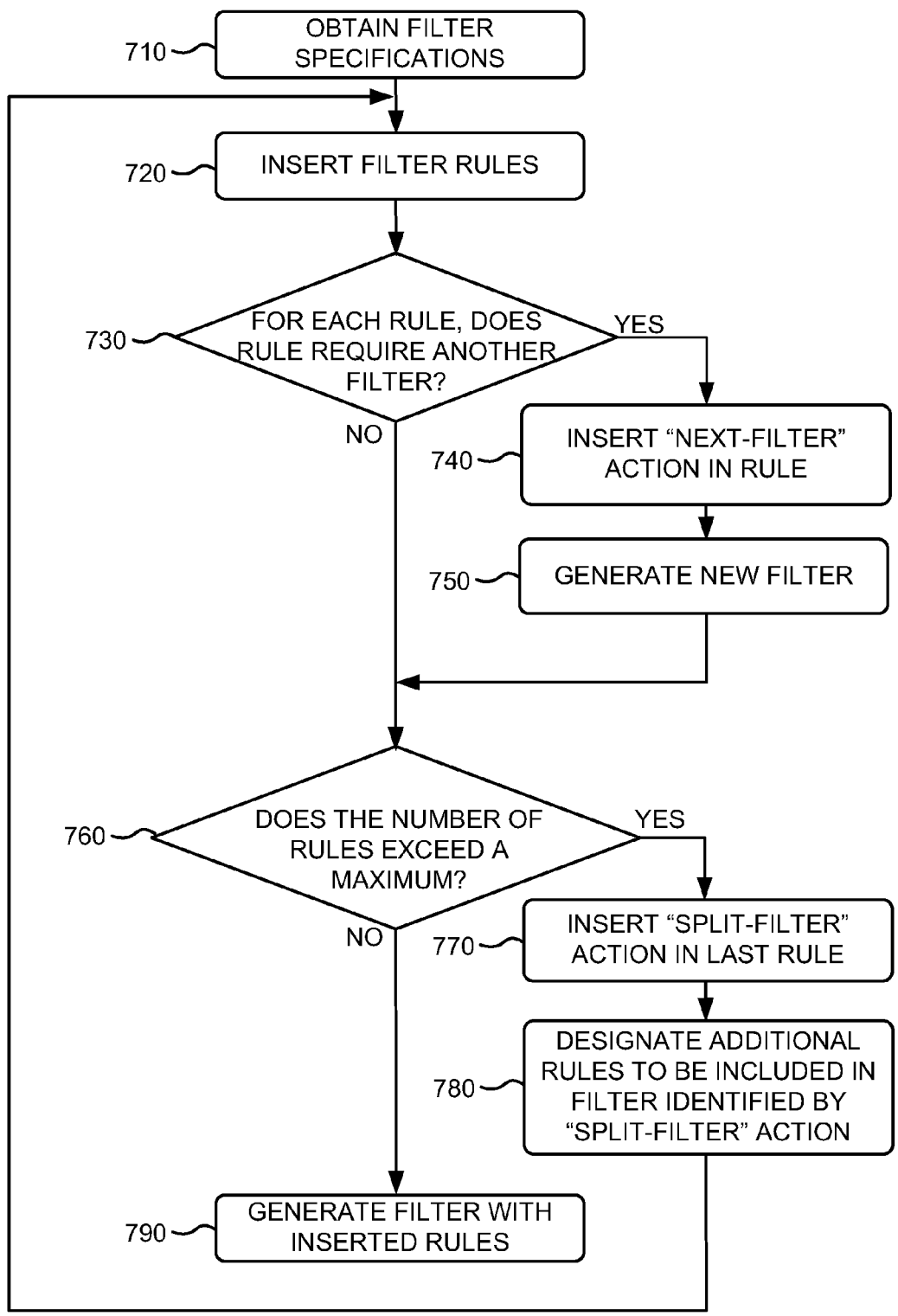
FIG. 7 is a diagram of a flow chart illustrating an example process for programming a filter according to an implementation described herein.

FIG. 7 is a diagram of a flow chart illustrating an example process for programming a filter according to an implementation described herein. In one implementation, the process of FIG. 7 may be performed by firewall device 110. In other implementations, some or all of the process of FIG. 7 may be performed by another device or a group of devices separate and/or possibly remote from or including firewall device 110.

The process of FIG. 7 may include obtaining filter specifications (block 710). For example, filter programmer 460 may obtain a program for configuring a filter. The rules may be inserted into the filter (block 720). For example, filter programmer 460 may generate rules based on the obtained filter specifications.

For each rule, a determination may be made as to whether the rule requires another filter (block 730). In one example, filter programmer 460 may determine whether the rule identifies another filter that is to be processed. In another example, filter programmer 460 may determine whether the rule includes additional conditional statements that may require additional match conditions.

If it is determined that the rule requires another filter (block 730—YES), a next-filter action may be inserted into the rule (block 740) and a new filter may be generated (block 750). In one example, the new filter may already exist and may be identified by the rule. In another example, the new filter may be created based on conditions specified in the filter specifications.

For example, assume a filter program includes the following:

```
filter f1 {
    :
    :
    term t25 {
        from        {
                    source-address {address1;
                                    address2;
                                    address3}
                    }
        then
                    if         {
                                MACaddress1
                                MACaddress2
                                :
                                MACaddressN
                                }
                    then accept;
    :
```

```
    :
    }
```

This filter program specifies that if a packet is from source addresses address1, address2, or address2, then a check is to be performed to see if the packet is associated with one of the MAC addresses MACaddress1 to MACaddressN. If the packet is associated with one of these MAC addresses, then the packet may be accepted. In this example, filter programmer 460 may generate a next-filter action for rule term t25 that identifies a new filter and may generate the new filter. The new filter may include rules that check for MACaddress1 to MACaddressN. Thus, the above example filter program may be converted to:

```
filter f1 {
    :
    term t25 {
        from        {
                    source-address {address1;
                                    address2;
                                    address3}
                    }
        then
                    next-filter filter f2;
    :
    :
    }
```

Processing may continue to block 760. If the rule does not require another filter (block 730—NO), processing may also continue to block 760.

A determination may be made as to whether the number of rules exceeds a maximum (block 760). For example, filter programmer 460 may determine whether the number of rules in the obtained filter specifications exceeds a maximum number of rules that may be stored in a hardware filter. If it is determined that the number of rules exceeds the maximum (block 760—YES), a split-filter action may be inserted into the last rule (block 770) and additional rules may be designated to be included in another hardware filter specified by the split-filter action (block 780). For example, filter programmer 460 may split the filter specifications into two hardware filters and may logically link the two hardware filters by including the split-filter action in the last rule of the first hardware filter. Processing may return to block 720 to insert the additional filter rules into the next (e.g., the second) physical filter.

For example, assume a maximum of 1,024 rules and assume that a filter program includes the following:

```
filter f1 {
    term t1 {
        match condition A;
        then accept;
        }
    term t2
    :
    term t1024 {
        match condition B;
        then accept;
        }
    term t1025 {
        match condition C;
        then accept;
        }
```

Filter programmer 460 may convert the above example filter program to:

```
filter f1_1 {
    term t1 {
        match condition A;
        then accept;
    }
    term t2
    :
    :
    term t_last {
        split-filter f1_2
    }
}
and
filter f1_2 {
    term t1024 {
        match condition B;
        then accept;
    }
    term t1025 {
        match condition C;
        then accept;
    }
    :
    :
}
```

If it is determined that the number of rules does not exceed the maximum (block 760—NO), the filter with the inserted rules may be generated (block 790). For example, filter programmer 460 may generate the filter in filter memory 435.

It should be noted that additional split-filter actions and next-filter actions may be used, as required by the obtained filter specifications, to chain hardware filters together to incorporate all of the obtained filter specifications. Therefore, using split-filter actions and next-filter actions, hardware filters 510 may be chained without limit, thereby overcoming limitations to a maximum number of rules in a single physical filter and overcoming limitations regarding a hardware attachment sequence of filters specified in filter sequence 433.

The foregoing description provides illustration and description, but is not intended to be exhaustive or to limit the implementations to the precise form disclosed. Modifications and variations are possible in light of the above teachings or may be acquired from practice of the described implementation.

For example, while series of blocks have been described with respect to FIGS. 6 and 7, the order of the blocks may be modified in other implementations. Further, non-dependent blocks may be performed in parallel.

Also, certain portions of the implementations may have been described as a "component," "unit," "dispatcher," "block," or "programmer" that performs one or more functions. The "component," "unit," "dispatcher," "block," and "programmer" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A method comprising:
    accessing, by a firewall device and based on a filter specification, a first hardware-implemented filter of a plurality of hardware-implemented filters associated with the firewall device,
        each of the plurality of hardware-implemented filters being a physical filter included in the firewall device and not being a software-implemented filter,
        the filter specification identifying a filter sequence of the plurality of hardware-implemented filters to be executed to process packets;
    processing, by the firewall device, a packet using the first hardware-implemented filter identified by the filter sequence,
        the packet being processed based on first information included in the packet and a type of filter associated with the first hardware-implemented filter;
    determining, by the firewall device, that a particular rule, associated with the first hardware-implemented filter, includes a next-filter action,
        the next-filter action identifying a second hardware-implemented filter that is not included in the filter sequence;
    accessing, by the firewall device, and based on the next-filter action and the packet, the second hardware-implemented filter; and
    processing, by the firewall device, the packet using the second hardware-implemented filter after processing the packet using the first hardware-implemented filter and before processing the packet using a third hardware-implemented filter included in the filter sequence,
        an actual sequence for processing the packet of using the second hardware-implemented filter after processing the packet using the first hardware-implemented filter and before processing the packet using the third hardware-implemented filter being different than the filter sequence indicated by the filter specification,
        the packet being processed based on second information included in the packet and a type of filter associated with the second hardware-implemented filter.

2. The method of claim 1, further comprising:
    obtaining a set of rules associated with processing the packet using the first hardware-implemented filter;

determining that a rule, included in the set of rules, requires another filter; and
inserting the particular rule into the set of rules based on the rule requiring the other filter.

3. The method of claim 2, where the determining that the rule requires the other filter includes:
   determining that the rule identifies the second hardware-implemented filter.

4. The method of claim 1, further comprising:
   programming the second-hardware implemented filter based on the filter specification.

5. The method of claim 1, further comprising:
   determining that a last rule, associated with the second hardware-implemented filter, includes a split-filter action,
      the split-filter action identifying a fourth hardware-implemented filter;
   linking, based on the last rule including the split-filter action, the fourth hardware-implemented filter to the second hardware-implemented filter to cause the fourth hardware-implemented filter to be a logical continuation of the second hardware-implemented filter; and
   processing, based on linking the fourth hardware-implemented filter to the second hardware-implemented filter, the packet using the fourth hardware-implemented filter based on the second information and the type of filter associated with the second hardware-implemented filter.

6. The method of claim 1, where processing the packet using the first hardware-implemented filter includes:
   generating a first set of keys based on the first information and the type of filter associated with the first hardware-implemented filter, and
   comparing the first set of keys to a set of match conditions of a set of rules associated with the first hardware-implemented filter; and
   where processing the packet using the second hardware-implemented filter includes:
      generating a second set of keys based on the second information and the type of filter associated with the second hardware-implemented filter, and
      comparing the second set of keys to a set of match conditions of a set of rules associated with the second hardware-implemented filter.

7. The method of claim 1,
   where the filter sequence indicates the third hardware-implemented filter is to process the packet directly after the first hardware-implemented filter, and
   where the second hardware-implemented filter is outside of the filter sequence.

8. A device comprising:
   a plurality of hardware-implemented filters,
      each of the plurality of hardware-implemented filters being a physical filter and not being a software-implemented filter; and
   a processor to:
      access, based on a filter specification, a first hardware-implemented filter of the plurality of hardware-implemented filters associated with the device,
         the filter specification identifying a filter sequence of the plurality of hardware-implemented filters to be executed to process packets;
      process a packet using the first hardware-implemented filter identified by the filter sequence,
         the packet being processed based on first information included in the packet and a type of filter associated with the first hardware-implemented filter;
      determine that a particular rule, associated with the first hardware-implemented filter, includes a next-filter action,
         the next-filter action identifying a second hardware-implemented filter that is not included in the filter sequence;
      access, based on the next-filter action and the packet, the second hardware-implemented filter; and
      process the packet using the second hardware-implemented filter after processing the packet using the first hardware-implemented filter and before processing the packet using a third hardware-implemented filter included in the filter sequence,
         an actual sequence for processing the packet of using the second hardware-implemented filter after processing the packet using the first hardware-implemented filter and before processing the packet using the third hardware-implemented filter being different than the filter sequence indicated by the filter specification,
         the packet being processed based on second information included in the packet and a type of filter associated with the second hardware-implemented filter.

9. The device of claim 8, where the processor is further to:
   obtain one or more rules associated with the first hardware-implemented filter;
   determine that the one or more rules are associated with another filter; and
   insert the particular rule into the one or more rules based on the one or more rules being associated with the other filter.

10. The device of claim 8, where the processor is to:
    determine that a match condition, associated with the next-filter action, is satisfied; and
    where, when accessing the second hardware-implemented filter, the processor is to:
       access the second hardware-implemented filter based on the match condition being satisfied.

11. The device of claim 10, where, when determining that the match condition is satisfied, the processor is to:
    determine that the packet is associated with a particular network.

12. The device of claim 8, where the device comprises a firewall device.

13. The device of claim 8, where the second hardware-implemented filter is associated with a set of rules, and
    where the processor is further to:
       determine that a quantity of rules included in the set of rules is greater than a maximum quantity of rules;
       associate a first portion of the set of rules with the second hardware-implemented filter;
       insert a rule that includes a split-filter action into the first portion of the set of rules,
          where the rule is inserted as a last rule of the first portion of the set of rules,
          where the split-filter action identifies a fourth hardware-implemented filter, and
          where the split-filter action causes the fourth hardware-implemented filter to be linked to the second hardware-implemented filter; and
       associate, based on inserting the rule, a second portion of the set of rules with the fourth hardware-implemented filter.

14. The device of claim 8, where, when processing the packet using the first hardware-implemented filter, the processor is to:

generate a first set of keys based on the first information and the type of filter associated with the first hardware-implemented filter, and compare the first set of keys to a set of conditions associated with the first hardware-implemented filter; and where, when processing the packet using the second hardware-implemented filter, the processor is to:

generate a second set of keys based on the second information and the type of filter associated with the second hardware-implemented filter, and compare the second set of keys to a set of conditions associated with the second hardware-implemented filter.

15. The device of claim 8, where the hardware-implemented filters and the processor are implemented in at least one application specific integrated circuit (ASIC) chip.

16. A non-transitory computer-readable medium storing instructions, the instructions comprising:

one or more instructions that, when executed by one or more processors of a network device, cause the one or more processors to:

access, based on a filter specification, a first hardware-implemented filter of a plurality of hardware-implemented filters associated with the network device, each of the plurality of hardware-implemented filters being a physical filter included in the network device and not being a software-implemented filter, the filter specification identifying a filter sequence of the plurality of hardware-implemented filters, process a packet using the first hardware-implemented filter identified by the filter sequence, the packet being processed based on first information included in the packet and a set of rules associated with the first hardware-implemented filter;

determine that a particular rule, of the set of rules associated with the first hardware-implemented filter, includes a next-filter action, the next-filter action identifying a second hardware-implemented filter that is not included in the filter sequence;

access, based on the next-filter action and the packet, the second hardware-implemented filter; and process the packet using the second hardware-implemented filter after processing the packet using the first hardware-implemented filter and before processing the packet using a third hardware-implemented filter included in the filter sequence, an actual sequence for processing the packet of using the second hardware-implemented filter after processing the packet using the first hardware-implemented filter and before processing the packet using the third hardware-implemented filter being different than the filter sequence indicated by the filter specification, the packet being processed based on second information included in the packet and a type of filter associated with the second hardware-implemented filter.

17. The non-transitory computer-readable medium of claim 16, where the instructions further comprise:

one or more instructions that, when executed by the one or more processors, cause the one or more processors to:

determine that a rule, included in the set of rules associated with the first hardware-implemented filter, requires another filter; and insert the particular rule into the set of rules associated with the first hardware-implemented filter based on the rule requiring the other filter.

18. The non-transitory computer-readable medium of claim 17, where the one or more instructions to determine that the rule requires the other filter include:

one or more instructions that, when executed by the one or more processors, cause the one or more processors to:

determine that the rule identifies the second hardware-implemented filter.

19. The non-transitory computer-readable medium of claim 16, where the instructions further comprise:

one or more instructions that, when executed by the one or more processors, cause the one or more processors to:

determine that a last rule, of a set of rules associated with the second hardware-implemented filter, includes a split-filter action, the split-filter action identifying a fourth hardware-implemented filter;

link, based on the last rule including the split-filter action, the fourth hardware-implemented filter to the second hardware-implemented filter to cause the fourth hardware-implemented filter to be a logical continuation of the second hardware-implemented filter when processing the packet; and process, based on linking the fourth hardware-implemented filter to the second hardware-implemented filter, the packet using the fourth hardware-implemented filter based on the second information and the type of filter associated with the second hardware-implemented filter.

20. The non-transitory computer-readable medium of claim 16, where the one or more instructions to process the packet using the first hardware-implemented filter include:

one or more instructions that, when executed by the one or more processors, cause the one or more processors to:

generate a first set of keys based on the first information and a type of filter associated with the first hardware-implemented filter, and process the packet based on the first set of keys and the set of rules associated with the first hardware-implemented filter; and where the one or more instructions to process the packet using the second hardware-implemented filter include:

one or more instructions that, when executed by the one or more processors, cause the one or more processors to:

generate a second set of keys based on the second information and a type of filter associated with the second hardware-implemented filter, and process the packet based on the second set of keys and the set of rules associated with the second hardware-implemented filter.

* * * * *